March 6, 1962 E. RIBCHESTER 3,024,304
SOUND CARRIER AS SOURCE OF AUTOMATIC CHROMA CONTROL VOLTAGE
Filed Sept. 4, 1958
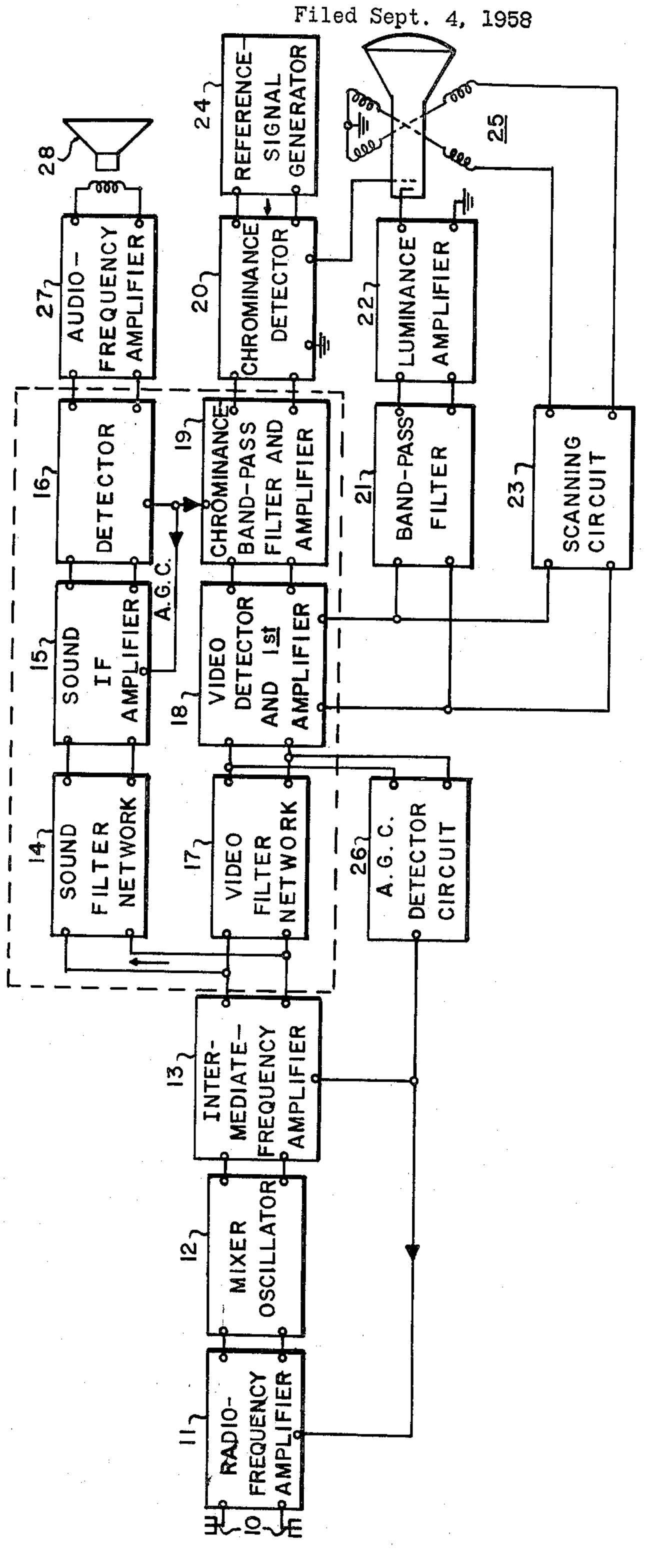

United States Patent Office 3,024,304
Patented Mar. 6, 1962

3,024,304
SOUND CARRIER AS SOURCE OF AUTOMATIC CHROMA CONTROL VOLTAGE

Eric Ribchester, Hanworth, England, assignor to Hazeltine Research, Inc., Chicago, Ill., a corporation of Illinois Filed Sept. 4, 1958, Ser. No. 759,056
Claims priority, application Great Britain Sept. 6, 1957
3 Claims. (Cl. 178—5.4)

This invention relates to color-television automatic-gain-control apparatus and, in particular, to such apparatus useful in color-television receivers of the kind adapted to reproduce the picture from received luminance and chrominance information signals which are transmitted by radio as modulations of carrier waves, and to reproduce accompanying sound from a received sound signal which is transmitted by radio as modulation of another carrier wave, the chrominance carrier frequency being relatively close to the sound carrier frequency but appreciably more remote from the luminance carrier frequency.

In order to obtain satisfactory reproduction of the picture in a color-television receiver it is necessary to maintain a predetermined amplitude ratio between the luminance and chrominance signals, and so long as the luminance and chrominance signals arriving at the receiver are in a constant amplitude ratio, then the predetermined amplitude ratio can quite easily be obtained in the receiver. However, the transmitted luminance and chrominance signals may be subject to different fading effect during their transmission from the transmitter to the receiver, and hence the amplitude ratio between the received luminance and chrominance signals may vary. It may, therefore, be desirable to incorporate in such a receiver, in addition to the usual automatic-gain-control arrangement in the sound signal channel, automatic-gain-control arrangements which separately control the over-all amplification of the luminance and chrominance signals; and such arrangements may include means for deriving an automatic-gain-control signal from the chrominance signal, which means is complicated and expensive.

The inventor has appreciated that it is not necessary to include means for deriving an automatic-gain-control signal from the chrominance signal in a color-television receiver of the kind with which the invention is concerned since the transmitted sound signal occupies a frequency band adjacent that occupied by the transmitted chrominance signal and is, therefore, subject to substantially the same fading effects as the transmitted chrominance signal.

It is, therefore, an object of the present invention to provide new and improved color-television automatic-gain-control apparatus which avoids the limitations of prior such apparatus.

It is another object of the present invention to provide color-television automatic-gain-control apparatus which is simply and inexpensively constructed and which enables the chrominance channel to be controlled separately of the luminance channel.

In accordance with the present invention, color-television automatic-gain-control apparatus comprises supply means including first circuit means for supplying a modulated sound carrier signal having a mean carrier amplitude, and including second circuit means for supplying a video signal having luminance and chrominance signal components. The apparatus also includes a chrominance signal-translating channel coupled to the supply means and capable of translating the chrominance signal with varying mean carrier signal amplitudes. The apparatus further includes means coupled to the chrominance channel and responsive to the mean carrier amplitude of the sound signal for controlling the gain of the channel in inverse relationship with respect to the mean carrier amplitude of the sound signal in such a manner that the effect of fading of the chrominance signal is substantially eliminated.

For a better understanding of the present invention, together with other and further objects thereof, reference is had to the following description taken in connection with the accompanying drawing, and its scope will be pointed out in the appended claims.

Referring to the single figure of the drawing, there is shown in schematic form a color-television receiver utilizing the present invention.

One arrangement in accordance with the invention will now be described with reference to a color-television receiver for the British equivalent of the National Television System Committee system. In this British system, the transmitted picture is represented by a composite television signal consisting of interlaced fields each of 202½ lines and having a repetition frequency of 50 fields/second. This composite signal is amplitude modulated on a main television carrier, being transmitted mainly as the lower side band, and comprises a luminance signal in which components of frequency up to about 3 megacycles may be present, and a chrominance signal which is generated by a pair of signals in which components of frequency up to 0.34 megacycle and 1.0 megacycle, respectively, may be present and which respectively amplitude modulate a pair of subcarrier waves of the same frequency which are in phase quadrature, this subcarrier frequency being approximately 2.66 megacycles, the exact frequency being such that it lies exactly half way between two adjacent harmonics of the line frequency. Accompanying sound is transmitted as amplitude modulation of a second carrier wave whose frequency is such that the sound carrier and chrominance subcarrier frequencies are separated by approximately 800 kilocycles. While the NTSC signal has slightly different standards, the problem of differential fading between the luminance and chrominance is effectively the same in both the British and American systems and, therefore, it will be understood that the present invention is equally useful in both cases.

The receiver includes a radio-frequency amplifier 11 for amplifying all the received signals fed to it from the antenna 10, 10 and a mixer oscillator 12 in which the frequencies on which the sound and color-television signals are transmitted are converted to suitable intermediate frequencies. The mixer oscillator 12 is then coupled to a first intermediate-frequency amplifier 13.

In accordance with the invention, color-television automatic-gain-control apparatus comprises supply means including a first circuit means for supplying a modulated sound carrier signal having a mean carrier amplitude and including a second circuit means for supplying a video signal having luminance and chrominance signal components. In the drawing, the first and second circuit means include suitable filter networks 14 and 17, respectively, to separate the sound signal and the television signals. Included in the supply means is video detector 18, shown coupled to filter network 17. The output signal of detector 18 includes the luminance signal and the chrominance signal, which latter is still modulated on a subcarrier wave signal. The detected luminance signal is then fed through band-pass filter 21 to a luminance amplifier 22.

Sound IF amplifier 15 is coupled to the output terminals of filter network 14. These latter units comprise in the supply means the first circuit means for supplying a second carrier signal.

The control apparatus also includes a chrominance channel coupled to the supply means and capable of translating the chrominance signal with varying mean carrier signal amplitudes. This channel includes, coupled to the output of the video detector 18, a band-pass filter and amplifier circuit 19 coupled to a chrominance detector 20 comprising a pair of synchronous detectors wherein the chrominance signals are detected in the conventional manner by the application of a locally generated signal from reference-signal generator 24. The outputs of the luminance amplifier 22 and the detector 20 are fed to a color image-reproducing device 25 where they are utilized in conventional manner to reproduce the picture. Filter network 17 and detector 18 comprise a video signal-translating channel.

The control apparatus also includes means coupled to the chrominance channel and responsive to the sound signal for controlling the gain of said channel in inverse realtionship with respect to the mean carrier amplitude of the sound signal in such a manner that the effect of fading of the chrominance signal is substantially eliminated. This latter means may comprise any conventional automatic-gain-control potential generator and in the illustrated receiver includes detector 16 which may be a conventional envelope detector with any suitable arrangement for the derivation of the control potential.

A conventional scanning circuit 23 is coupled between the video detector 18 and the horizontal and vertical scan windings of image-reproducing device 25. The chrominance signals from chrominance detector 20 and the luminance signals from luminance amplifier 22 are coupled to the control electrode and cathode, respectively, of device 25 for producing in conventional manner a color image.

A first automatic-gain-control potential is generated by a conventional automatic-gain-control circuit 26 which is coupled to the output of video filter network 17. This first control potential is applied to the first intermediate-frequency amplifier 13 and radio-frequency amplifier 11 to control the gain thereof so as to remove substantially the effect of fading of the transmitted luminance signal.

The sound signal at the output of the first intermediate-frequency amplifier 13 is subject to amplitude variations which are dependent on the differential fading between the sound and luminance signals, and since the sound and chrominance signals occupy adjacent frequency bands and are therefore subject to substantially the same fading effects during transmission, the chrominance signal at the output of the first intermediate-frequency amplifier is subject to similar amplitude variations. A second automatic-gain-control voltage is, therefore, generated by the automatic-gain-control circuit in detector 16 which is fed from the output of the sound intermediate-frequency amplifier 15, and this automatic-gain-control potential is applied simultaneously to control the gain of the sound intermediate-frequency amplifier 15 and the chrominance band-pass filter and amplifier 19 in the chrominance channel so as to remove substantially these amplitude variations from the sound and chrominance signals.

Since the receiver illustrated in the drawing is arranged to be used in the British color-television system and since, in this system, the sound carrier is amplitude modulated in accordance with the sound information, detector 16 was described as being an envelope detector. However, in the NTSC system the sound carrier is frequency modulated. In this case it will be understood that a conventional ratio detector with the AGC potential derived from its output circuit in a conventional manner may be used as detector 16. Also, the well known Foster-Seeley type of discriminator may be inserted for detector 16 in which an AGC detector similar to that found in unit 26 may be coupled directly to the output terminals of sound IF amplifier 15. This modified arrangement would be required by the fact that the latter discriminator has no provisions therein for generating an AGC potential, since it is necessarily preceded by an amplitude limiter circuit.

While the type of receiver system which utilizes a conventional separate or split-carrier IF arrangement is shown in the drawing, it may be desirable in some instances to utilize in the receiver an intercarrier type of arrangement such as is found in most American receivers. In this latter arrangement the sound and color-television signal-separating networks 14 and 17 are inserted subsequent to the video detector 18. The automatic-gain-control apparatus would, however, remain substantially the same in both arrangements.

It is seen that in a receiver utilizing the apparatus of the present invention the effects of fading of the transmitted sound, luminance, and chrominance signals are substantially removed and that, in consequence, the luminance and chrominance signals are obtained in the receiver in constant amplitude ratio so that satisfactory reproduction of the picture may be achieved.

While there has been described what is at present considered to be the preferred embodiment of this invention, it will be obvious to those skilled in the art that various changes and modifications may be made therein without departing from the invention, and it is, therefore aimed to cover all such changes and modifications as fall within the true spirit and scope of the invention.

What is claimed is:

1. Color-television automatic-gain-control apparatus comprising: supply means including first circuit means for supplying a modulated sound carrier signal having a mean carrier amplitude and including second circuit means for supplying a video signal having luminance and chrominance signal components; a chrominance signal-translating channel coupled to said supply means and capable of translating said chrominance signal with varying mean carrier signal amplitudes; and means responsive to the mean carrier amplitude of the sound signal and coupled to the chrominance channel for controlling the gain of said channel in inverse relationship with respect to said mean carrier amplitude of the sound signal in such a manner that the effect of fading of the chrominance signal is substantially eliminated.

2. Color-television automatic-gain-control apparatus comprising: supply means including first circuit means for supplying a modulated sound carrier signal having a mean carrier amplitude and second circuit means for supplying a video signal having luminance and chrominance signal components; a chrominance signal-translating channel coupled to said supply means and capable of translating said chrominance signal with varying mean carrier signal amplitudes; and means including an automatic-gain-control potential generator responsive to the mean carrier amplitude of the sound signal and coupled to the chrominance channel for controlling the gain of said channel in inverse relationship with respect to said mean carrier amplitude of the sound signal in such a manner that the effect of fading of the chrominance signal is substantially eliminated.

3. Color-television automatic-gain-control apparatus comprising: supply means including first circuit means for supplying a modulated sound carrier signal having a mean carrier amplitude and second circuit means for supplying a video signal having luminance and chrominance signal components; a chrominance signal-translating channel including a band-pass amplifier coupled to said supply means and capable of translating said chrominance signal with varying mean carrier signal amplitudes; and means responsive to the mean carrier amplitude of the sound signal and coupled to the band-pass amplifier for controlling the gain of said channel in inverse relationship with respect to said mean carrier amplitude of the sound signal in such a manner that the effect of fading of the chrominance signal is substantially eliminated.

References Cited in the file of this patent

UNITED STATES PATENTS

| | | |
|---|---|---|
| 2,137,123 | Lewis et al. | Nov. 15, 1938 |
| 2,635,140 | Dome | Apr. 14, 1953 |
| 2,798,900 | Bradley | July 9, 1957 |